United States Patent
Brown

(10) Patent No.: US 8,998,096 B2
(45) Date of Patent: Apr. 7, 2015

(54) MAGNETIC EMISSIVE USE OF PRELOADED PAYMENT CARD ACCOUNT NUMBERS

(75) Inventor: Kerry D. Brown, Portola Valley, CA (US)

(73) Assignee: Coin, Inc., San Francisco, CA (US)

( * ) Notice: Subject to any disclaimer, the term of this patent is extended or adjusted under 35 U.S.C. 154(b) by 442 days.

(21) Appl. No.: 12/752,390

(22) Filed: Apr. 1, 2010

(65) Prior Publication Data

US 2011/0240745 A1 Oct. 6, 2011

(51) Int. Cl.
*G06K 19/06* (2006.01)
*G06K 7/08* (2006.01)
*G06Q 20/34* (2012.01)
*G07F 7/08* (2006.01)

(52) U.S. Cl.
CPC .............. *G06Q 20/34* (2013.01); *G06Q 20/347* (2013.01); *G07F 7/084* (2013.01); *G07F 7/0886* (2013.01)

(58) Field of Classification Search
CPC .................. G06K 19/07749; G06K 19/07732; G06K 7/10237; G06K 2017/0041; H01Q 7/00; H01Q 1/2208; G06Q 20/3576; G06Q 20/341; G06Q 20/352; G06Q 20/3574; G06Q 20/3278; G07F 7/0806; G07F 7/1008; H04M 17/02; H04M 15/68; H04M 1/72575; H04M 2215/0196; H04M 1/0274; H04W 74/00; H04W 12/06; H04W 88/00; H04W 88/02
USPC .................. 235/380, 492, 439, 493; 382/115
See application file for complete search history.

(56) References Cited

U.S. PATENT DOCUMENTS

| | | |
|---|---|---|
| 3,978,524 A | 8/1976 | Gordon |
| 4,605,844 A | 8/1986 | Haggan |
| 4,701,601 A | 10/1987 | Francini |
| 4,734,897 A | 3/1988 | Schotz |
| 4,791,283 A | 12/1988 | Burkhardt |
| 5,307,326 A | 4/1994 | Osawa |
| 5,434,398 A | 7/1995 | Goldberg |
| 5,535,078 A | 7/1996 | Warwick |
| 5,834,747 A | 11/1998 | Cooper |
| 5,834,756 A | 11/1998 | Gutman |
| 5,910,866 A | 6/1999 | Shiomoto |

(Continued)

FOREIGN PATENT DOCUMENTS

| | | |
|---|---|---|
| WO | WO 0021020 A2 * | 4/2000 |
| WO | 0247019 | 6/2002 |
| WO | 2013068768 | 5/2013 |

OTHER PUBLICATIONS

Office Action for U.S. Appl. No. 13/225,188, dated Apr. 3, 2013, 13 pages.

(Continued)

*Primary Examiner* — Thien T Mai
(74) *Attorney, Agent, or Firm* — Amin, Turocy & Watson, LLP

(57) ABSTRACT

A thin-client access card has a card body with partial or fully emissive magnetic data tracks. An emissive element is disposed in the card body under the location of the legacy magnetic data tracks. An electronic signal conditioner converts audio signals from a mobile device into magnetic data applied to the emissive element. A swipe sensor detects when the thin-client access card is being swiped by a legacy card reader, and triggers an output of magnetic data from the emissive element while proximal to the POS reader head. A cable attaches the thin-client access card as a peripheral to the mobile device with an audio output jack.

9 Claims, 8 Drawing Sheets

(56) References Cited

U.S. PATENT DOCUMENTS

| | | | |
|---|---|---|---|
| 6,058,319 | A | 5/2000 | Sadler |
| 6,308,890 | B1 | 10/2001 | Cooper |
| 6,510,983 | B2 | 1/2003 | Horowitz |
| 6,607,127 | B2 | 8/2003 | Wong |
| 6,764,005 | B2 | 7/2004 | Cooper |
| 6,769,607 | B1 | 8/2004 | Pitroda |
| 6,811,082 | B2 | 11/2004 | Wong |
| 7,028,897 | B2 | 4/2006 | Fernandes |
| 7,114,652 | B2 | 10/2006 | Moullette |
| 7,127,236 | B2 | 10/2006 | Khan |
| 7,252,232 | B2 | 8/2007 | Fernandes |
| 7,357,319 | B1 | 4/2008 | Liu |
| 7,364,092 | B2 | 4/2008 | Narendra |
| 7,376,433 | B1 | 5/2008 | Hose |
| 7,483,858 | B2 | 1/2009 | Foran et al. |
| 7,711,100 | B2 | 5/2010 | Dennis |
| 8,074,877 | B2 | 12/2011 | Mullen et al. |
| 2002/0190121 | A1 | 12/2002 | Walker et al. |
| 2004/0026506 | A1 | 2/2004 | Finkelstein |
| 2004/0177045 | A1* | 9/2004 | Brown ............................ 705/65 |
| 2005/0194452 | A1* | 9/2005 | Nordentoft et al. ........... 235/492 |
| 2006/0000891 | A1* | 1/2006 | Bonalle et al. ................ 235/380 |
| 2006/0023218 | A1 | 2/2006 | Jung et al. |
| 2007/0007348 | A1 | 1/2007 | Shah |
| 2007/0044139 | A1 | 2/2007 | Tuyls et al. |
| 2007/0189581 | A1* | 8/2007 | Nordentoft et al. ........... 382/115 |
| 2007/0241183 | A1* | 10/2007 | Brown et al. ................. 235/380 |
| 2008/0173717 | A1* | 7/2008 | Antebi et al. ................. 235/439 |
| 2008/0191009 | A1 | 8/2008 | Gressel et al. |
| 2008/0307515 | A1 | 12/2008 | Drokov et al. |
| 2009/0037275 | A1 | 2/2009 | Pollio |
| 2009/0145964 | A1 | 6/2009 | Blythe |
| 2009/0159670 | A1 | 6/2009 | Mullen et al. |
| 2009/0159700 | A1* | 6/2009 | Mullen et al. ................. 235/493 |
| 2009/0310779 | A1 | 12/2009 | Lam et al. |
| 2010/0031173 | A1 | 2/2010 | Djemal |
| 2010/0044444 | A1* | 2/2010 | Jain et al. ..................... 235/492 |
| 2010/0219234 | A1 | 9/2010 | Forbes |
| 2010/0320266 | A1 | 12/2010 | White |
| 2010/0328032 | A1 | 12/2010 | Rofougaran |
| 2011/0251892 | A1 | 10/2011 | Laracey |
| 2013/0153655 | A1 | 6/2013 | Dawkins |
| 2013/0256421 | A1 | 10/2013 | Johnson et al. |
| 2014/0108263 | A1 | 4/2014 | Ortiz et al. |
| 2014/0149285 | A1 | 5/2014 | De et al. |

OTHER PUBLICATIONS

Office Action for U.S. Appl. No. 13/225,188, dated Oct. 22, 2013, 8 pages.

Office Action for U.S. Appl. No. 13/225,188, dated Apr. 25, 2014, 14 pages.

Corcoran, J., "Partnering for Profit: 2 Types of Mobile Payments," Fortress Mobile Payments, A Power Point Presentation, c. 2013, 7 pages.

"Intelligent Mobile Payments," Fortress Payments, Jan. 11, 2013, 1 page.

"Intelligent Mobile Payments: QR Codes," Fortress Payments, Mar. 15, 2013, 2 pages.

"Mobile QR Code/NFC/WiFi Payments Patent," Mobile Patent Outline, A characterization of US Patent 7,483,858, Apr. 2013, PDF file creation Apr. 26, 2013 by Joseph Corcoran., 3 pages.

Corcoran, J., "Types of QR Codes Used in Payments," Fortress Payments, Briefing Paper, Jul. 2013, 20 pages, received from Author without restrictions.

Gao, J. et al., "A 2D Barcode-Based Mobile Payment System," Multimedia and Ubiquitous Engineering, 2009, MUE '09, Third International Conference on, IEEE, Piscataway, NJ, USA, Jun. 4, 2009, pp. 320-329.

Office Action for U.S. Appl. No. 14/098,840, dated Oct. 10, 2014, 30 pages.

Notice of Allowance for U.S. Appl. No. 13/225,188, dated Dec. 15, 2014, 25 pages.

* cited by examiner

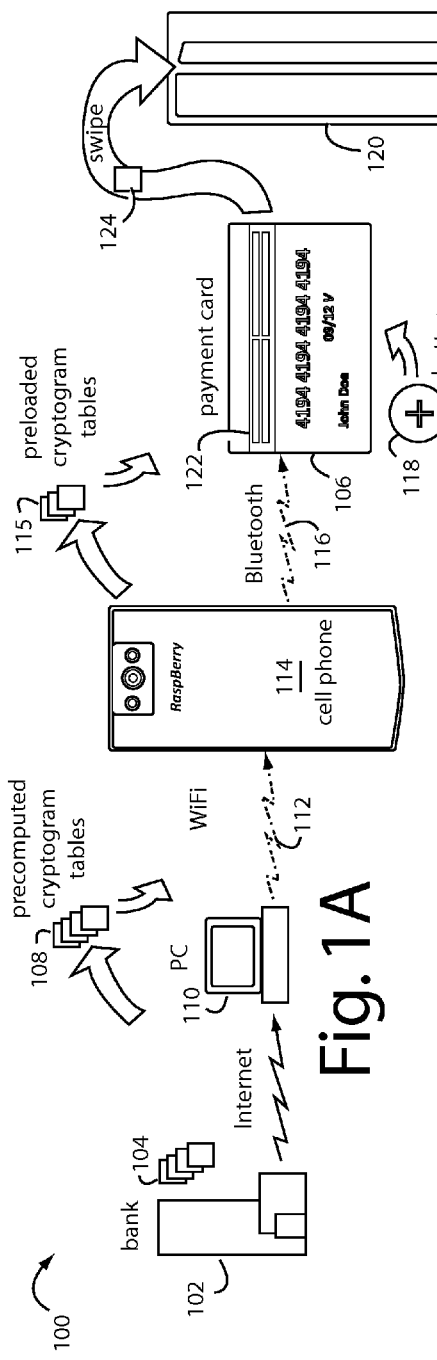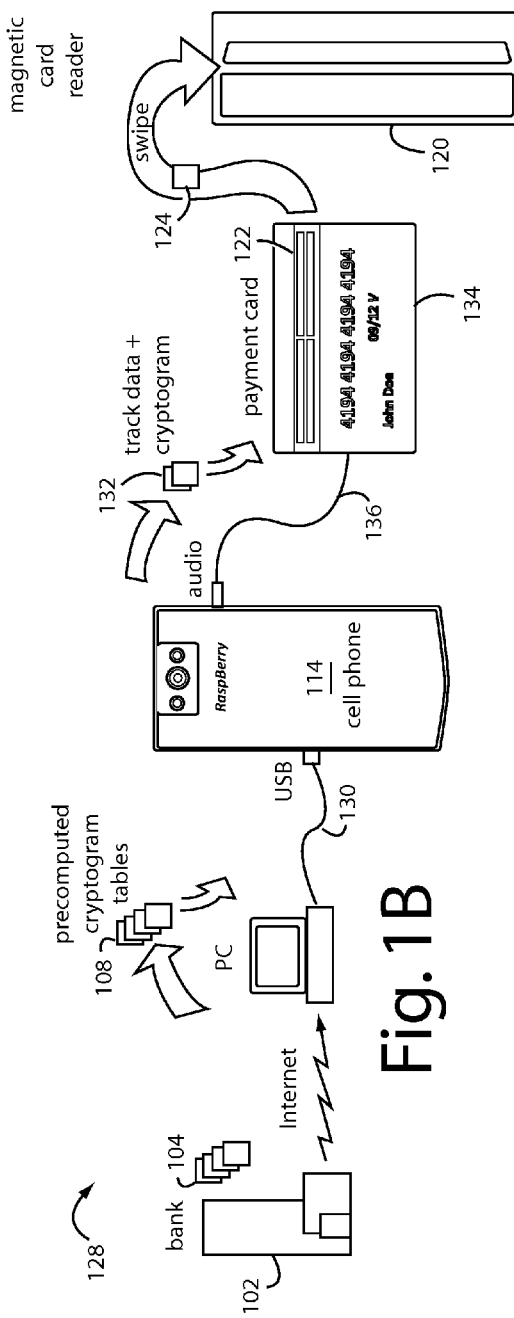

US 8,998,096 B2

MAGNETIC EMISSIVE USE OF PRELOADED PAYMENT CARD ACCOUNT NUMBERS

BACKGROUND OF THE INVENTION

1. Field of the Invention

The present invention relates to payment cards, and more particularly to emissive transmission of secret-key cryptograms, e.g., emissive electromagnetic stripe payment cards that have been preloaded with one or more secret-key use-once account numbers.

2. Description of Related Art

Conventional credit cards, debit cards, and other payment cards use a single account number that is open for all to see (and duplicate). Anyone that has held the card, read it, or otherwise managed to record the account number had little trouble in running charges up against the account. So merchants and banks started requiring identification, billing addresses, expiration dates, holograms, signature panels, and now security codes before completing a transaction. But loose enforcement of these measures has not really put much of an obstacle in the fraudsters' paths.

Use-once account numbers are an excellent way to control these types of fraud, but the use-once number needs to be magnetically readable by a legacy card reader or presented on a user display. These both require the inclusion of active electronics in the cards that raises the unit costs of the cards themselves and that often depend on batteries for their continued operation.

The technology required to put dynamic electromagnetic stripes on payment cards is very challenging. It would be desirable to have all the bits in every magnetic data track be programmable by the card itself so the use-once account numbers could be freely updated. But that requires magnetic device technology that does not exist, and the demands on the battery to support this mode are very high. Current magnetic device technology is further not up to the challenge of the high bit recording densities needed on track-1 of the typical payment card.

User account data is recorded on the electromagnetic stripes of conventional payment cards using industry-standard formats and encoding like ISO-7810, ISO-7811(-1:6), and ISO-7813, available from American National Standards Institute (NYC, NY). Such standards specify the physical characteristics of the cards, how to do the embossing, the electromagnetic stripe media characteristics for low-coercivity, the permissible locations for any embossed characters, the location of data tracks 1-3, any high-coercivity electromagnetic stripe media characteristics, etc.

A typical Track-1, as defined by the International Air Transport Association (IATA), as being seventy-nine alphanumeric 7-bit characters recorded at 210-bits-per-inch (bpi) with 7-bit encoding, Track-2, as defined by the American Bankers Association (ABA), is forty numeric characters at 75-bpi with 5-bit encoding, and Track-3 (ISO-4909) is typically one hundred and seven numeric characters at 210-bpi with 5-bit encoding. Each track includes starting and ending sentinels, and a longitudinal redundancy check character (LRC). The Track-1 format can include user primary account information, user name, expiration date, service code, and discretionary data. Conventional payment card magnetic tracks conform to the ISO/IEC Standards 7810, 7811-1-6, and 7813, and other formats.

The ISO 7810/7816 specifications and ABA/IATA stripe data fields describe a "discretionary field", and "other data field" that can be used exclusively for the issuing bank. The discretionary fields can be used for status bits and other operators.

Authentication factors are pieces of information that can be used to authenticate or verify the identity of a cardholder. Two-factor authentication employs two different authentication factors to increase the level of security beyond what is possible with only one of the constituents. For example, one kind of authentication factor can be what-you-have, such as electromagnetic stripe credit card or the SIM card typical to many mobile devices and personal trusted device (PTD). The second authentication factor can be what-you-know, such as the PIN code that you enter at an ATM machine. Using more than one authentication factor is sometimes called "strong authentication" or "multi-factor authentication," and generally requires the inclusion of at least one of a who-you-are or what-you-have authentication factor.

What is needed is a payment card that can magnetically provide use-once account numbers to legacy card readers.

SUMMARY OF THE INVENTION

Briefly, a thin-client access card embodiment of the present invention has a card body with a electromagnetic stripe and magnetic data tracks. An emissive element is disposed in the card body under the magnetic data tracks. An electronic signal conditioner converts audio signals from a mobile device into magnetic data applied to the emissive element. A swipe sensor detects when the thin-client access card has been swiped by a legacy card reader, and triggers an output of magnetic data from the emissive element. A cable attaches the thin-client access card as a peripheral to the mobile device through an audio output jack.

The above and still further objects, features, and advantages of the present invention will become apparent upon consideration of the following detailed description of specific embodiments thereof, especially when taken in conjunction with the accompanying drawings.

BRIEF DESCRIPTION OF THE DRAWINGS

FIGS. 1A and 1B are data flow diagrams of a payment system embodiment of the present invention in which secret-key cryptograms are downloaded by a cellphone or other mobile device and that can be installed into a payment card with magnetic emissive elements in the electromagnetic stripe;

FIG. 2B illustrates how two magnetic data tracks can be divided into partial data tracks to control crosstalk;

DETAILED DESCRIPTION OF THE INVENTION

Figure 2A:
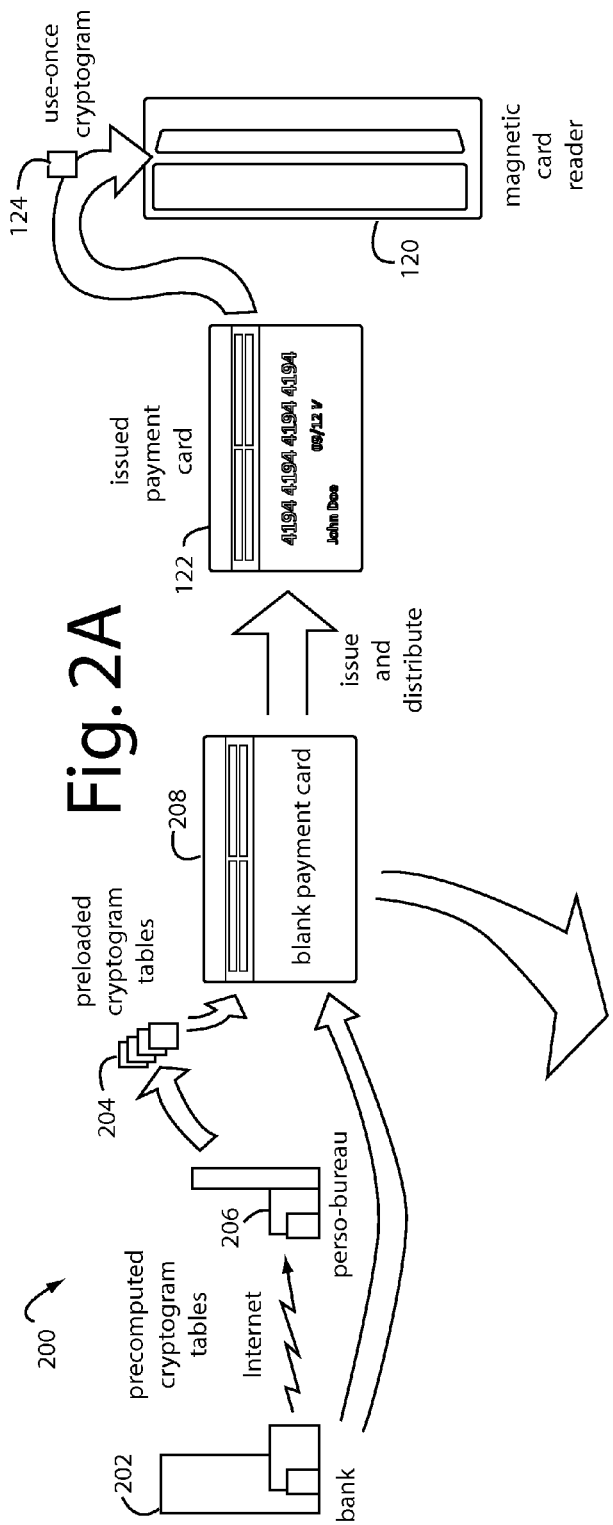
FIGS. 2A and 2B together show a data flow diagram of a financial payment system embodiment of the present invention that divides two magnetic data tracks into a first half and a second half to control inter-channel crosstalk.

FIGS. 1A-1B represent improved payment system embodiments of the present invention. In FIG. 1A, a system 100 includes a bank 102, or other payment card issuer, that pre-computes user account numbers and corresponding cryptograms 104. These are encrypted in groups with a secret key using a symmetric-key algorithm. The secret keys and symmetric-key algorithms themselves never leave the bank 102, and are never shared. The secret keys are used by the bank's symmetric-key algorithms for both encrypting and decrypting the account numbers and corresponding cryptograms 104. The account numbers and corresponding cryptograms 104 are each used only once, and so each payment card 106 is provisioned with enough to last a typical user about three years. For example, three thousand cryptograms.

Encryption algorithms which use the same key for both encryption and decryption are known as symmetric key algorithms. Another class of "public key" cryptographic algorithms uses a pair of keys, one to encrypt and one to decrypt. These asymmetric key algorithms allow one key to be made public while keeping a private key at only one location. Discovering the private key is extremely difficult, even if its corresponding public key is known. So a user of public key technology can publish their public key, while keeping their private key secret. This allows anyone to send them an encrypted message that they will be able to decrypt. In addition, root key certificates, and their high maintenance cost, render this method difficult for static magnetic media payment cards, or unidirectional transmission from payment card to the retailer POS device.

In FIG. 1A, the Internet is used to download precomputed cryptogram tables 108 to a personal computer (PC) 110, which in turn uses WiFi 112 (e.g., IEEE 802.11a/b/g/n) or infrared IRDa to install them in a mobile phone 114. The mobile device can add some data to the discretionary field for such purposes as version of cryptograms, origination of cryptograms, location of download system for cryptograms, MAC address or UUID address of device used to download cryptograms, and similar. A set of cryptogram tables 115 are preloaded into payment card 106 using a Bluetooth connection 116 or similar near field communication (NFC).

Infrared (IR) is another means of transmitting data from a mobile device to a card. Infrared links are not considered by some to be as secure a channel as NFC, but these problems may be overcome in the future. The Infra-red device association (IrDa) is working on developing standards. So, alternatively in FIG. 1A, cell phone 114 could use Infra-Red technology rather than the Bluetooth connection 116 shown to communicate with payment card 106.

A battery 118 inside payment card 106 allows payment card to retain the preloaded cryptogram tables 115 and to thereafter operate autonomously in financial transactions with a merchant card reader 120. A electromagnetic stripe 122 provides a magnetic data reading 124 whenever payment card 106 is swiped in the merchant card reader 120. Such magnetic data reading 124 will include some data that was originally included in the precomputed cryptogram tables 108. The bank 102 can be queried to authenticate the payment card 106.

An alternative system embodiment 128 is represented in FIG. 1B, the Internet is again used to download precomputed cryptogram tables 108 to personal computer (PC) 110. This, in turn, uses a universal serial bus (USB) 130 to install them in a mobile phone 114. WiFi 112 could also be used, as well as USB 130 being used in system 100. A cryptogram and magnetic track data 132 are output in real-time into a tethered payment card 134 using a audio connection 136. The electromagnetic stripe 122 provides a magnetic data reading 124 as tethered payment card 134 is swiped through merchant card reader 120. Such magnetic data reading 124 will include some data that was originally included in the precomputed cryptogram tables 108. The bank 102 can be queried to authenticate the payment card 134. An advantage to the tethered method is that the card may not require an integrated battery or processor, thereby lowering the cost significantly.

FIG. 2 represents an improved payment system embodiment of the present invention, and is referred to herein by the general reference numeral 200. A bank 202 or other payment card issuer sends precomputed cryptogram tables 204 to a personalization bureau 206. A blank payment card 208 is loaded with the precomputed cryptogram tables 204 and personalized for specific users before being issued and distributed.

Payment card 208 includes a electromagnetic stripe 210 with four partial tracks 211-214 divided longitudinally by a gap 216. Partial tracks 211-212 lie in a Track-1 recognized by magnetic card reader 120, for example, and partial tracks 213-213 lie in a Track-2. Any of partial tracks 211-214 can be implemented as conventional magnetic recordings, or implemented with an inductor that emits serially time encoded electro-magnetic fields to mimic those of a conventional magnetic recording being swiped past a read head in a legacy card reader 120. An issued payment card 122 can therefore provide a magnetic data 124 that simulates all data normally provided in Track-1 and Track-2 of conventional payment cards. The difference is those portions implemented with inductors can dynamically change the data they transmit to accommodate use once cryptograms and account numbers that are changed for every transaction.

In conventional payment cards, data is laid out on a standard electromagnetic stripe in three tracks. A electromagnetic stripe card may have any of these tracks, or a combination of the three tracks. Payment card 208 uses track-1 and track-2.

Track-1 was standardized by the International Air Transportation Association (IATA) and is still reserved for their use. It is 210-bpi with room for seventy-nine 7-bit characters, six data bits plus one parity bit in ASCII.

| Track 1 Fields | |
|---|---|
| Start sentinel | 1 byte (the % character) |
| Format code | 1 byte alpha (The standard for financial institutions specifies format code is "B") |
| Primary Account number | Up to nineteen characters. American Express inserts space characters in here in the same places the digits |

-continued

| Track 1 Fields | |
|---|---|
| | are broken up on the face of the card. |
| Separator | 1 byte (the ^ character) |
| Country code | 3 bytes, if used. (The United States is 840) This is only used if the account number begins with "59." |
| Surname | |
| Surname separator | (the/character) |
| First name or initial | |
| Space | (when followed by more data) |
| Middle name or initial | |
| Period | (when followed by a title) |
| Title | (when used) |
| Separator | 1 byte (^) |
| Expiration date or separator | 4 bytes (YYMM) or the one byte separator if a non-expiring card. |
| Discretionary data | Optional data can be encoded here by the issuer. |
| End Sentinel | 1 byte (the ? character) |
| Longitudinal Redundancy Check (LRC) | 1 byte. The LRC is made up of parity bits for each "row" of bytes, making the total even. That means that the total of all the bit ones of each byte has to come out to an even number. Same for bit 2, etc. The LRC's parity bit is not the sum of the parity bits of the message, but only the parity bit for the LRC character itself. (It's odd, just like any other single byte's parity bit.) |

Track 2 was developed by the American Bankers Association (ABA) for on-line financial transactions. It is 75-bpi with room for forty 5-bit numeric characters, four data bits plus one parity bit.

| Track-2 Fields | |
|---|---|
| Start sentinel | 1 byte (0x0B, or a; in ASCII) |
| Primary Account Number | Up to 19 bytes |
| Separator | 1 byte (0x0D, or an = in ASCII) |
| Country code | 3 bytes, if used. (The United States is 840) This is only used if the account number begins with "59." |
| Expiration date or separator | 4 bytes (YYMM) or the one byte separator if a non-expiring card |
| Discretionary data | Optional data can be encoded here by the issuer. |
| End Sentinel | 1 byte (0x0F, or a ? in ASCII) |
| Longitudinal Redundancy Check (LRC) | 1 byte. |

Track-3 is also occasionally used for financial transactions. The difference is in its ability to read/write. It also is 210-bpi, but with room for one hundred and seven numeric digits. Track 3 is used to store the enciphered PIN, country code, currency units, amount authorized, subsidiary account information, and other account restrictions. Track-3 has the same properties as track-1, e.g., start and end sentinels and an LRC byte. But there is no standard for the data content or format. Track-3 is not currently used by any national bank card issuer, but could be used in any of the embodiments of the present invention described here.

Electromagnetic stripe 122 can be employed in credit cards, time and attendance, personnel identification, ATM cards, bank cards (credit and debit cards including VISA and MasterCard), gift cards, loyalty cards, driver's licenses, telephone calling cards, membership cards, electronic benefit transfer cards, and other applications. Examples of cards which intentionally ignore ISO standards include hotel key cards, most subway and bus cards, and some national prepaid calling cards in which the balance is stored and maintained directly on the stripe and not retrieved from a remote database.

There are two types of static magnetic encoding materials standards, high-coercivity (HiCo) at 4000 Oe, and low-coercivity (LoCo) at 300 Oe but it is not unusual to have intermediate values at 2750 Oe. Coercivity is the measure of magnetic intensity that must be applied to a material to remove the residual magnetism when it has been magnetized to saturation. A payment card encoded with high-coercivity is less at risk of being accidentally erased than a low-coercivity encoded card. Most card systems support both types of media, but high-coercivity is generally recommended, especially for ID badges.

In practical terms, usually low coercivity electromagnetic stripes are a light brown color, and high coercivity stripes are nearly black. Exceptions include a proprietary silver-colored formulation on transparent American Express cards. High coercivity stripes are resistant to damage from most magnets likely to be owned by consumers. Low coercivity stripes are easily damaged by even a brief contact with a magnetic purse strap or fastener. Virtually all bank cards are encoded with high coercivity stripes despite a slightly higher cost per unit.

Figure 3:
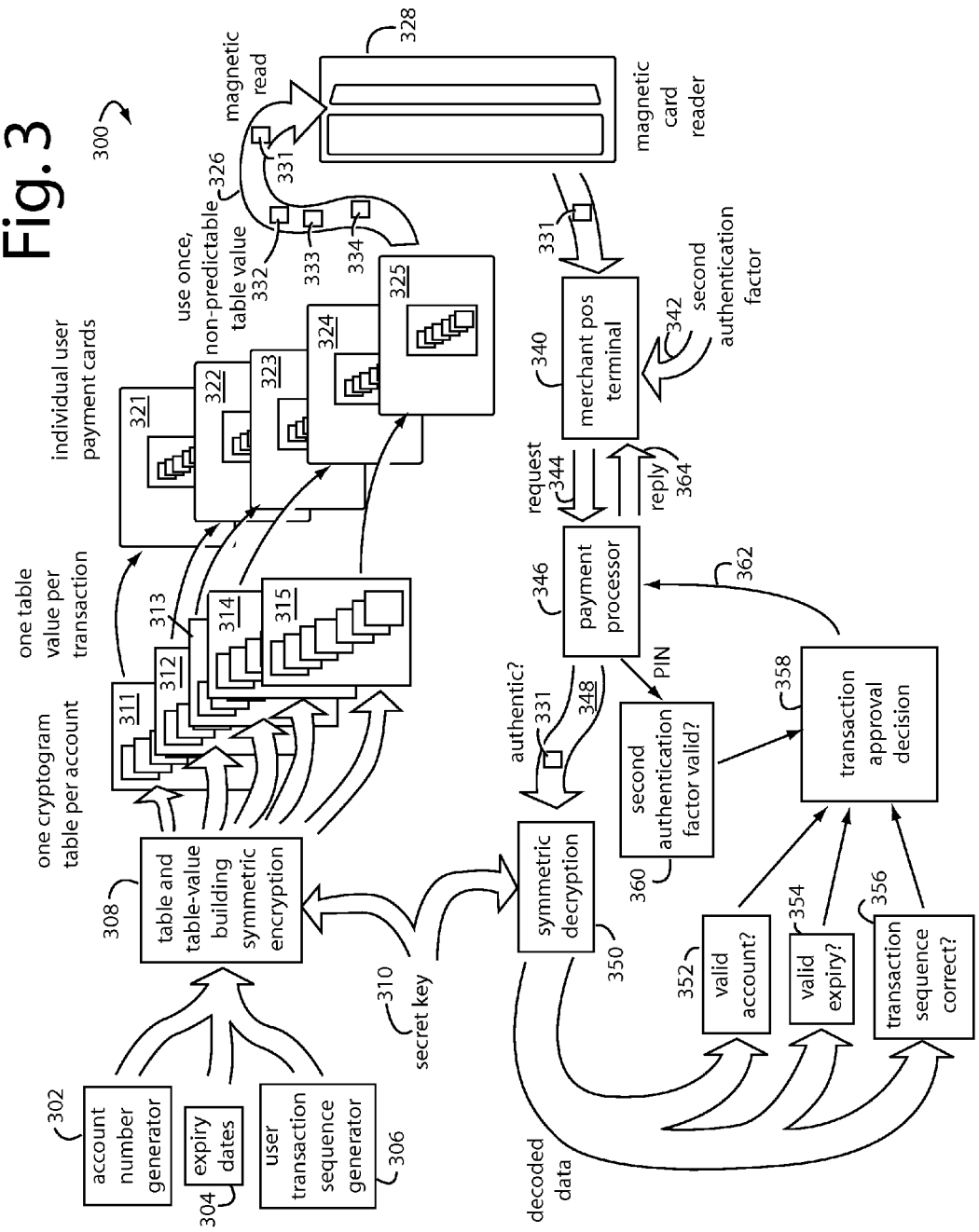
FIG. 3 is a flowchart diagram of financial payment system embodiment of the present invention that uses symmetric key encryption of account numbers, expiry numbers, and sequence numbers for use once cryptograms in payment cards.

FIG. 3 represents a financial payment system 300, in an embodiment of the present invention. It provides strong authentication of a user and their payment during a financial transaction. At a card issuing bank, an account number from a generator 302, an expiry date 304, and a sequence number from a generator 306 are grouped into tables. Symmetric encryption 308 and a secret key 310 are used to build cryptogram tables 311-315 for corresponding individual user payment cards 321-325.

For example, when a particular individual user payment card 325 is used in successive financial transactions with a merchant, a card swipe 326 by a legacy card reader 328 will sequentially collect use-once, non-predictable table values 331-334. A particular use-once, non-predictable table value 331, for example, will be forwarded to a merchant point-of-sale (POS) terminal 340. A second authentication factor 342 may be collected, such as a personal identification number (PIN) or card verification value (CVV2) that would only be known to the user or someone actually in possession of payment card 325. An electronic request 344 is forwarded to a payment processor 346 for transaction authorization. The particular use-once, non-predictable table value 331 is forwarded in a message 348 for symmetric decryption 350 using what should be secret key 310. The decryption will reconstruction the user account number, the expiry, and the sequence number. Tests 352, 354, and 356 check that these are correct, or within expected bounds. A transaction approval decision 358 is formulated. An approval depends on a check 360 of the second authentication factor 342. A signal 362 is returned as a reply 364 to the POS terminal 340.

Figure 4:
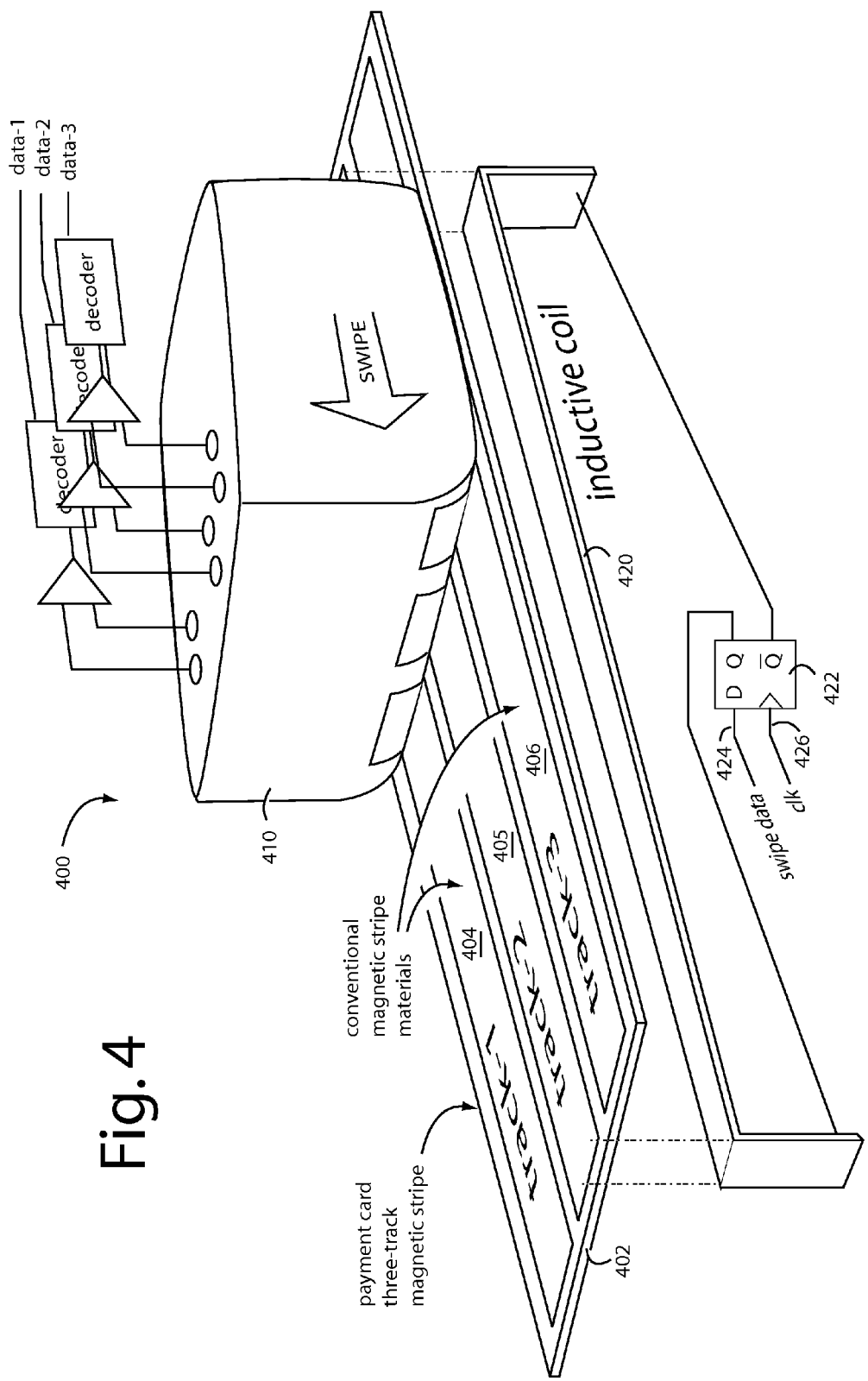
FIG. 4 is a perspective diagram showing how an inductive coil can be placed under the track-2 area of a electromagnetic stripe and read by a legacy card reader.

FIG. 4 represents a magnetic data reading system 400, in an embodiment of the present invention. A electromagnetic stripe 402 is similar to electromagnetic stripes 122 (FIGS. 1A-1B), 210 (FIG. 2B), and on payment cards 321-325 (FIG. 3). There are three magnetic data tracks, track-1 404, track-2 405, and track-3 406, similar to tracks 211-214 in FIG. 2B. Tracks 404 and 406 are conventional, track-2 405 is one embodiment of the present invention. A read head 410 is conventional and is a usual part of a legacy card reader, such as 120 in FIGS. 1A-1B, 2A, and 3.

Static magnetic bits are defined with two sub-intervals, the clock and the data sub-interval. The static magnetic stripe data is oriented in North-South sub-intervals to signify transitions from one sub-interval to another. It is these transitions that are decoded by the POS read head. The embodiments herein rely on the ability of the POS read head to distinguish sub-interval transitions. Either by the changing flux fields via North-South magnetic pole switching, or by an emissive coil producing a square wave that emulates these transitions. The transitions are not required to be zero-crossing. They only need to be inductively coupled to the head for a period of time, followed by a reduction of the head flux to nearly zero.

A deposited-film inductive coil 420 is shown highly simplified in FIG. 4, and is driven by a logic device 422 used as a driver. When a swipe of read head 410 on electromagnetic stripe 402 is detected, a swipe data signal 424 and a bit rate clock 426 will commence. The result will be to spoof read head 410 into accepting track-2 405 data that appears to be conventional. Of course, inductive coils could also be used under either or both of track-1 404 and track-3 406.

Figure 5A:
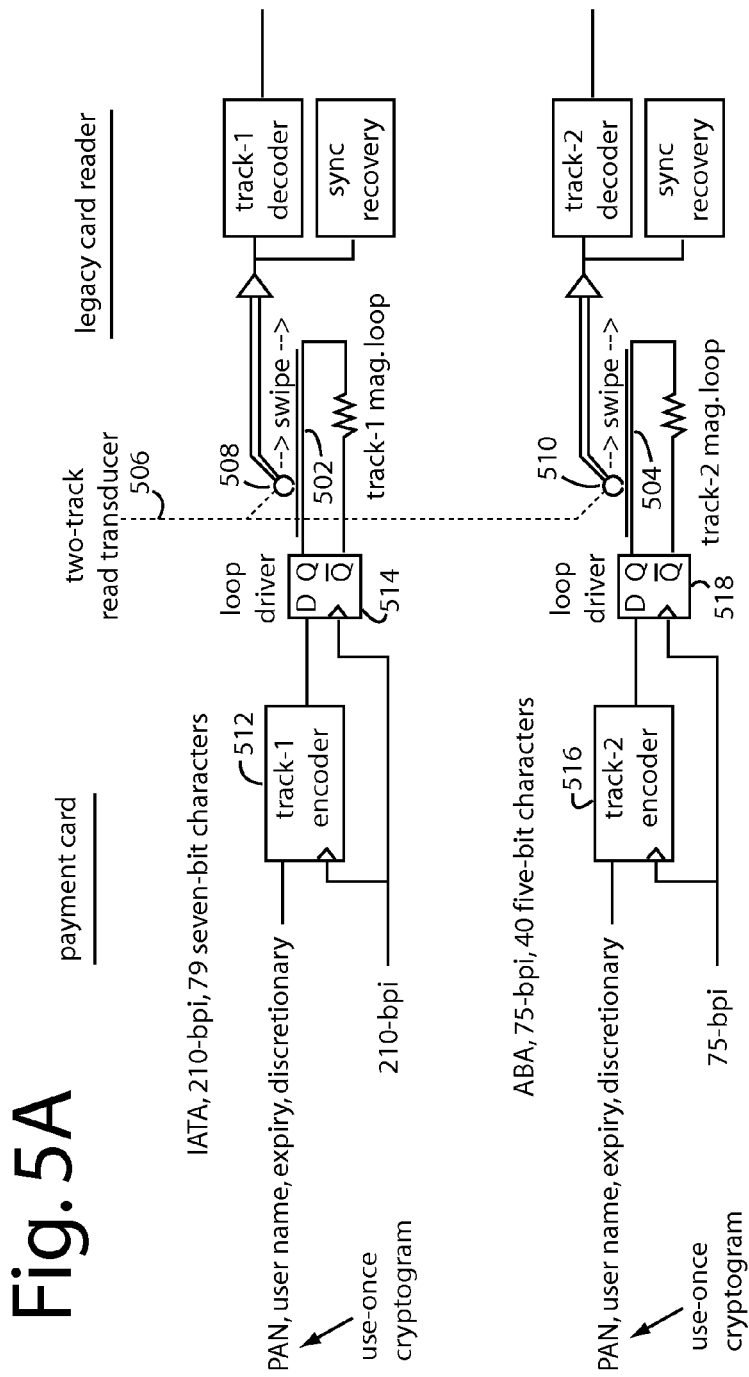
FIG. 5A is a schematic diagram of a two track implementation of inductive coils placed under the track-1 and track-2 areas of a electromagnetic stripe and read by a legacy card reader.

FIG. 5A represents a fully dynamic two track configuration 500, in an embodiment of the present invention that places two fully emissive inductive loops 502 and 504 side-by-side in tracks-1 and track-2 in a electromagnetic stripe mounted on a payment card. A two-track read transducer 506 in a conventional legacy card reader has a first gap 508 that reads track-1 502, and a second gap 510 that reads track-2 504. A track-1 encoder 512 formats a serial digital stream for loop driver 514 that conforms to IATA, 210-bpi, 79 seven-bit character standards. A track-2 encoder 516 formats a serial digital stream for loop driver 518 that conforms to ABA, 75-bpi, 40 five-bit character standards.

Figure 5B:
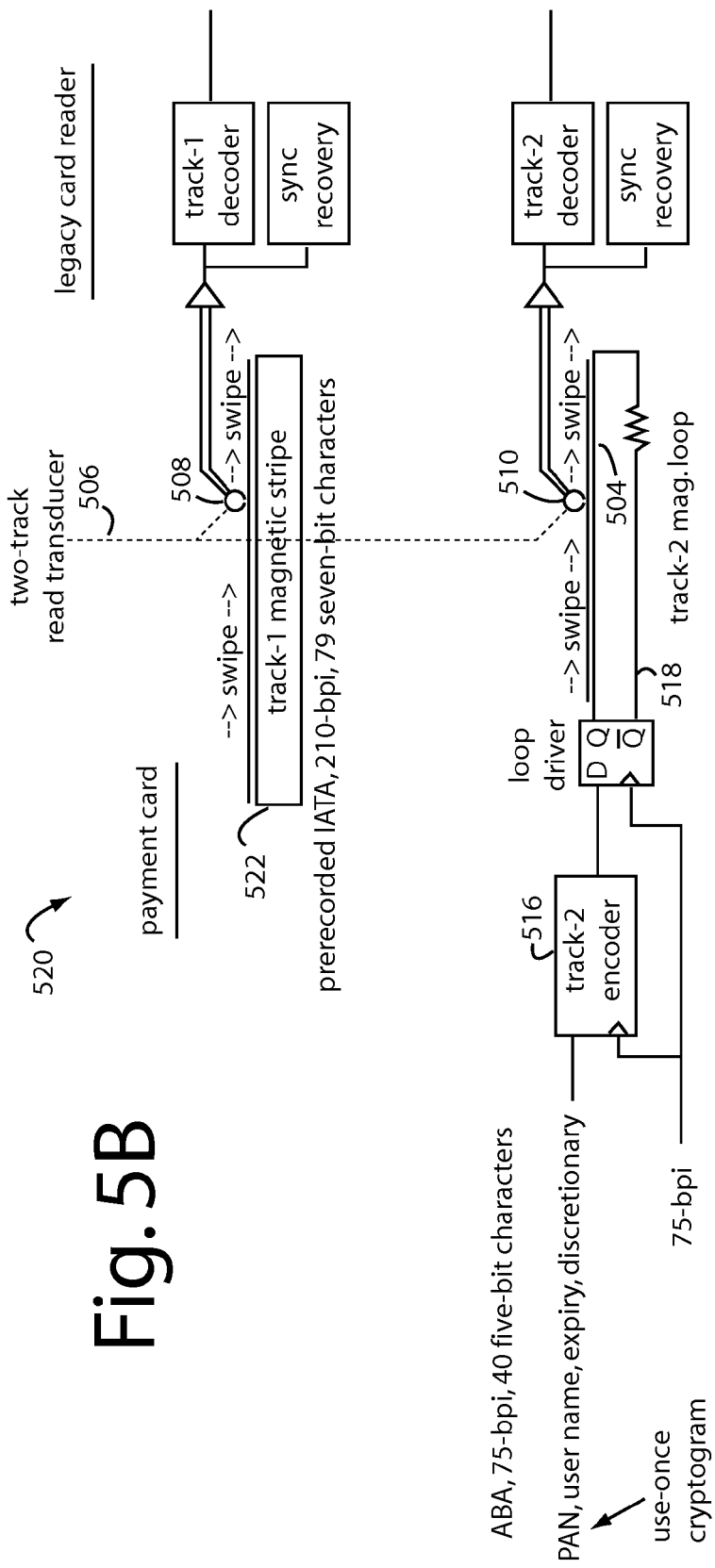
FIG. 5B is a schematic diagram of a two track implementation of a conventional magnetic data track and an inductive coil placed under the track-1 and track-2 areas of a electromagnetic stripe and read by a legacy card reader.

FIG. 5B represents a mixed conventional track-1 and a fully dynamic track-2 configuration 520, in an embodiment of the present invention that places fully emissive inductive loop 504 alongside a conventional track-1 in a electromagnetic stripe mounted on a payment card. A conventional two-track read transducer 506 in a legacy card reader has a first gap 508 that reads track-1 522, and a second gap 510 that reads track-2 504. As in FIG. 5A, track-2 encoder 516 formats a serial digital stream for loop driver 518 that conforms to ABA, 75-bpi, 40 five-bit character standards.

Figure 2B:
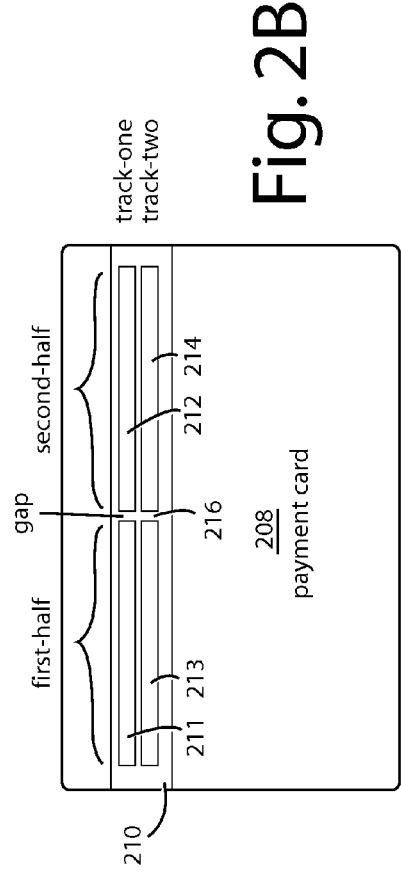
Figure 5C:
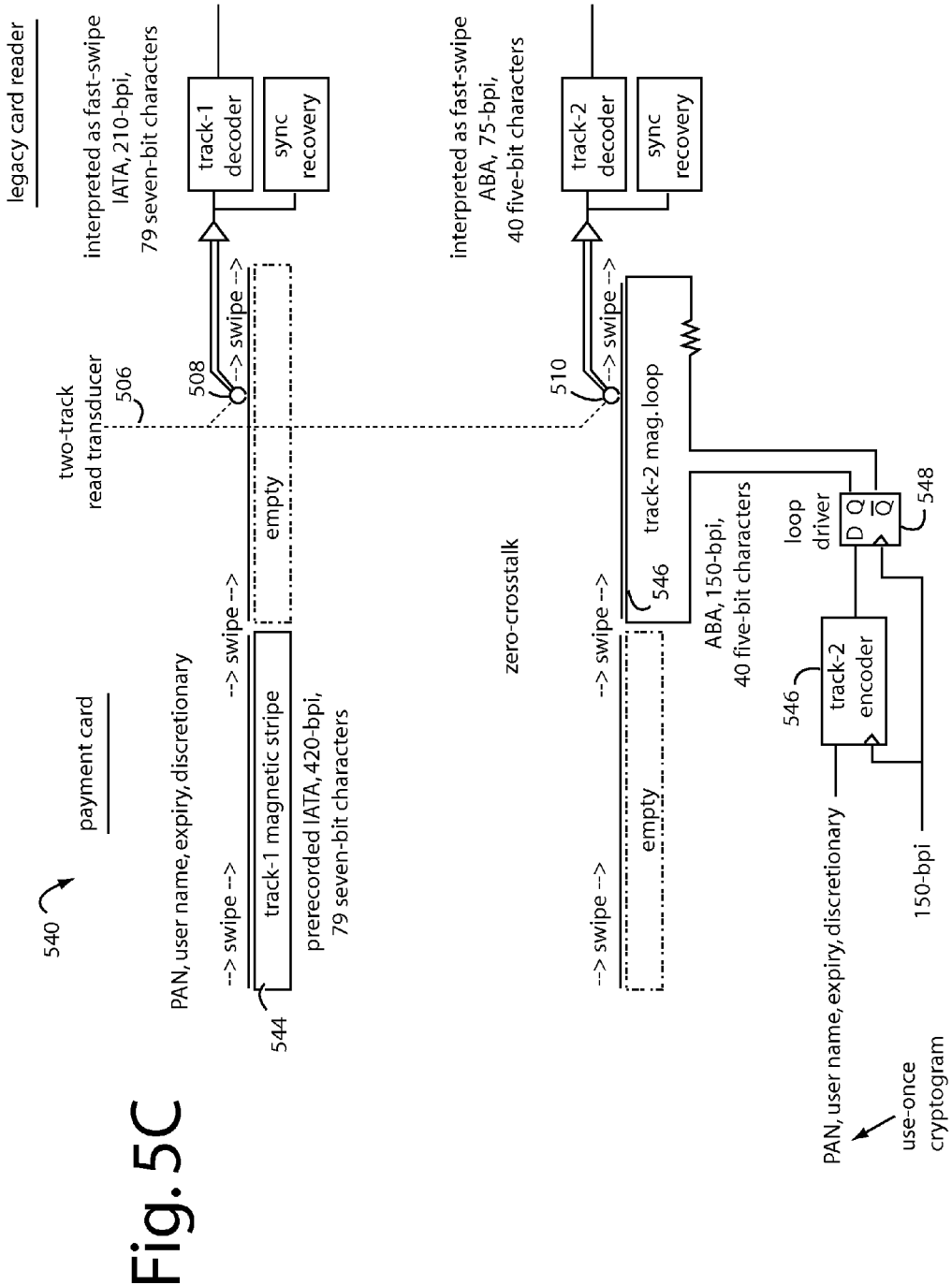
FIG. 5C is a schematic diagram of a two track implementation of a conventional magnetic data track and an inductive coil placed under partial track track-1 and track-2 areas of a electromagnetic stripe and read by a legacy card reader.

FIG. 5C represents a reduced channel cross talk configuration 540, in an embodiment of the present invention that staggers a fully emissive track-1 inductive loop 542 with respect to a foreshortened, but otherwise conventional track-2 in a magnetic stripe mounted on a payment card. In the context of FIG. 2B, these would be partial tracks 214 and 211, respectively. As before, conventional two-track read transducer 506 in a legacy card reader has a first gap 508 that reads track-1 544, and a second gap 510 that reads track-2 546. A track-2 encoder 546 formats a serial digital stream for loop driver 548 that conforms to ABA, 40 five-bit character standards, but at a square wave frequency of up to 15 kbps. Inductively coupled emissive data does not have to conform to a standard BPI level, since most POS readers accept data rates up, and even beyond, 10 kps. For this reason, the emissive element active area can remain short.

Industry standard card body sizes are 3.375" long by 2.125" wide by 0.030" thick. ISO Standard 7810 relates to the Physical characteristics of credit card size document; 7811-1 Embossing; 7811-2 Electromagnetic stripe-low coercivity; 7811-3 Location of embossed characters; 7811-4 Location of tracks 1 & 2; 7811-5 Location of track 3; 7811-6 Electromagnetic stripe-high coercivity; and, 7813 Financial transaction cards.

Figure 6:
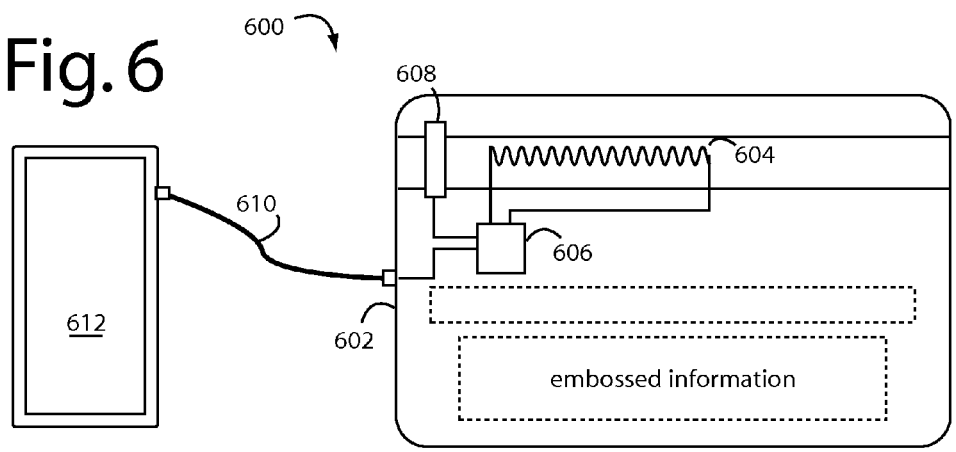
FIG. 6 is a functional block diagram of an access card embodiment of the present invention with an emissive coil element.

FIG. 6 represents an access card 600 that includes a card body 602 with an emissive element 604, electronic signal conditioners 606, a swipe sensor 608, and a cable 610 that is attached as a peripheral to a mobile device 612. No battery or PIC is needed is needed in peripheral access card 600 since it relies on the mobile device 612 to do decryption and security management and to output an audio signal with coded pulses that can be signal conditioned and directly introduced for reading through the emissive element 604 by a legacy card reader. The access card 600 is a thin-client, and simply an interface device to a legacy card reader in a compatible card format. The emissive element 604 can be a deposited-film inductive coil with predefined intra-track and inter-track spacings that correspond to particular data recording tracks, and that have zero persistence after a transfer of data.

Figure 7:
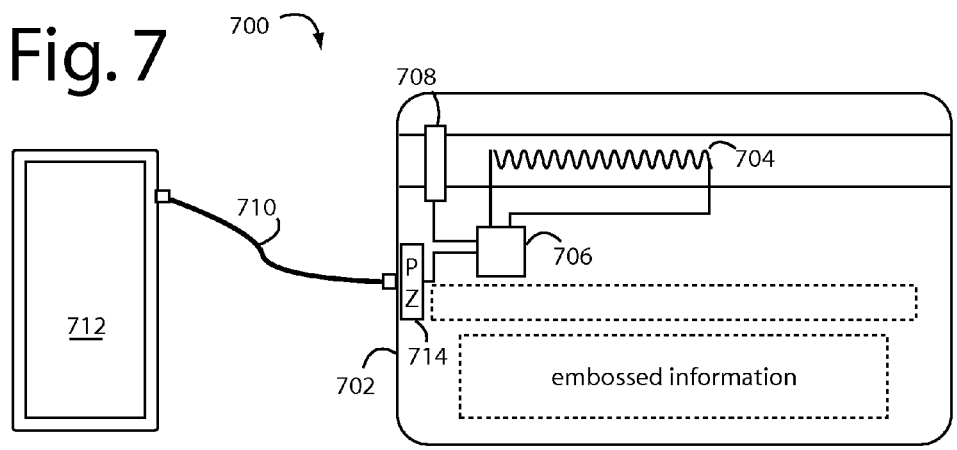
FIG. 7 is a functional block diagram of a thin-client access card embodiment of the present invention with an emissive coil element with an acoustic modem and piezoelectric device.

FIG. 7 represents an access card 700 that includes a card body 702 with an emissive element 704, electronic signal conditioners 706, a swipe sensor 708, and an acoustic modem 710 that couples to an earphone or speaker of a mobile device 712. A battery wouldn't be needed if a piezo-electric battery-generator 714 were included in peripheral access card 700. Mobile device 712 could also be relied on to do decryption and security management.

Figure 8:
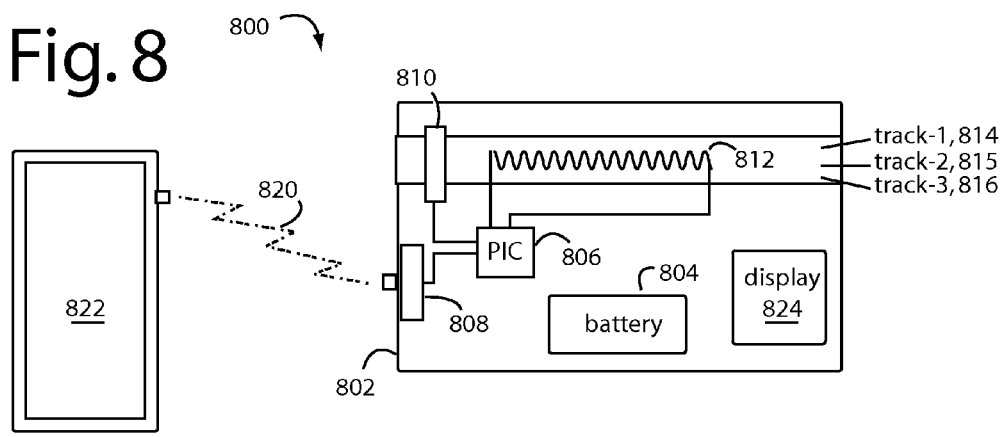
FIG. 8 is a functional block diagram of autonomous access card embodiment of the present invention with an emissive coil element and a display.

FIG. 8 represents an access card 800 with a card body 802, a battery 804, a microcontroller (PIC) 806 with a cryptogram storage 808, a swipe sensor 810, and an inductive element 812. Such can couple to a merchant POS read head, via one, two, or all three magnetic tracks 814-816. The three tracks 814-816 are formatted as ABA, IATA, and a proprietary track. The IATA track can be an ISO or ANSI track, according to the bank association. Access card 800 can implement all the magnetic bit elements as programmable and dynamic on either or both of track-1 and track-2. Various kinds of conventional short-distance communications technologies 820 can be used to download account access cryptograms from a mobile device 822. Access card 800 can further include a digital display 824 to designate coupons, personal information, authentication tokens for online usage, etc.

Access card 800 is an independent autonomous card that can be used for three years in the field, and has dynamic data elements, similar to those described by the present inventor in various issued United States Patents. However, in practice the embodiments described in these earlier patents are limited to about seven dynamic bit elements on Track-2, due to the device complexity and device size costs/fragility.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A payment card system, comprising:
   a mobile device; and
   a payment card;
   wherein the mobile device comprises a Bluetooth transmitter and the mobile device is configured to receive an encrypted account number, decrypt the encrypted account number, and to transmit the decrypted account number via the Bluetooth transmitter to the payment card;
   wherein the payment card comprises:
   a Bluetooth receiver for receiving the decrypted account number from the mobile device;
   a card body with an electromagnetic stripe area;
   an emissive inductive loop linearly disposed in the card body along the length of said, and configured for the serial output of dynamic magnetic data with a swipe data signal to spoof a read head of a legacy card reader into accepting the dynamic magnetic data as conventional track data;
   a microcontroller configured to convert mobile device into magnetic data for serial output by the emissive element in which serially time encoded electro-magnetic fields are emitted to mimic those of a conventional magnetic recording being swiped past said read head; and a swipe sensor configured to signal when the payment card has been swiped by a legacy card reader and for triggering an output that includes the decrypted account number magnetic data.

2. The system of claim 1 wherein the payment card comprises a digital display.

3. The system of claim 1 wherein the payment card comprises a piezo-electric generator.

4. The system of claim 1 wherein the mobile device comprises a WiFi receiver and the mobile device is configured to receive the encrypted account number via the WiFi receiver.

5. The system of claim 1 wherein the mobile device comprises a serial port and the mobile device is configured to receive the encrypted account number via the serial port.

6. The system of claim 5 wherein the serial port is a universal serial bus port.

7. A payment card, comprising:
- a Bluetooth receiver for receiving decrypted account number from a mobile device;
- a card body with an electromagnetic stripe area;
- an emissive inductive loop linearly disposed in the card body along the length of said electromagnetic stripe area, and configured for the serial output of dynamic magnetic data with a swipe data signal to spoof a read head of a legacy card reader into accepting the dynamic magnetic data as conventional track data;
- a microcontroller configured to convert the decrypted account number received from the mobile device into magnetic data for serial output by the emissive element in which serially time encoded electro-magnetic fields are emitted to mimic those of a conventional magnetic recording being swiped past said read head; and
- a swipe sensor configured to signal when the payment card has been swiped by a legacy card reader and for triggering an output that includes the decrypted account number magnetic data.

8. The system of claim 7 wherein the payment card comprises a digital display.

9. The system of claim 7 wherein the payment card comprises a piezo-electric generator.

* * * * *